United States Patent [19]
Sommer

[11] Patent Number: 5,716,299
[45] Date of Patent: *Feb. 10, 1998

[54] TWO SPEED DRIVE INCORPORATING REVERSE

[75] Inventor: Gordon Maurice Sommer, Grosse Pointe Farms, Mich.

[73] Assignee: Midwest Brake Bond Company, Warren, Mich.

[*] Notice: The term of this patent shall not extend beyond the expiration date of Pat. No. 5,454,765.

[21] Appl. No.: 698,255

[22] Filed: Aug. 14, 1996

Related U.S. Application Data

[63] Continuation of Ser. No. 343,129, Nov. 22, 1994, abandoned.

[51] Int. Cl.⁶ .................................................. F16H 57/08
[52] U.S. Cl. .................. 475/338; 475/219; 475/330; 475/339; 192/4 A; 192/18 A
[58] Field of Search ....................... 475/204, 219, 475/221, 330, 338, 339; 192/18 A, 18 R, 4 A

[56] References Cited

U.S. PATENT DOCUMENTS

| | | |
|---|---|---|
| 1,462,740 | 7/1923 | Cotal . |
| 2,753,894 | 7/1956 | Lovshin et al. . |
| 2,865,232 | 12/1958 | Nardone . |
| 2,918,832 | 12/1959 | Meyers . |
| 2,922,314 | 1/1960 | Johnson et al. . |
| 3,002,402 | 10/1961 | Howe . |
| 3,382,735 | 5/1968 | Gatiss . |
| 3,473,639 | 10/1969 | Becker et al. . |
| 3,487,726 | 1/1970 | Burnett . |
| 3,954,028 | 5/1976 | Windish .................... 475/328 |
| 4,020,932 | 5/1977 | Windish . |
| 4,023,439 | 5/1977 | Herr . |
| 4,296,650 | 10/1981 | Kalns . |
| 4,407,399 | 10/1983 | Wolff . |
| 4,460,075 | 7/1984 | Sommer . |
| 4,470,399 | 9/1984 | Wolff . |
| 4,516,444 | 5/1985 | Herr, Jr. . |
| 4,532,827 | 8/1985 | Beim .................... 192/18 A |
| 4,552,255 | 11/1985 | Sommer . |
| 4,592,251 | 6/1986 | Mason . |
| 4,607,736 | 8/1986 | Kelley . |
| 4,644,819 | 2/1987 | Zugel . |
| 4,668,664 | 5/1987 | Miller .................... 192/18 A |
| 5,026,334 | 6/1991 | Jeffries . |
| 5,194,057 | 3/1993 | Sommer . |
| 5,195,623 | 3/1993 | Sommer . |
| 5,285,879 | 2/1994 | Sommer . |
| 5,323,888 | 6/1994 | Sommer . |
| 5,328,419 | 7/1994 | Motl et al. .................... 475/338 X |
| 5,454,765 | 10/1995 | Sommer .................... 475/154 |
| 5,540,120 | 7/1996 | Sommer .................... 475/338 X |

Primary Examiner—Rodney H. Bonck
Assistant Examiner—Saúl J. Rodríguez
Attorney, Agent, or Firm—Harness, Dickey & Pierce

[57] ABSTRACT

A drive system has a pair of planetary gear sets located between an input shaft and an output shaft with an intermediate shaft located between the pair of planetary gear sets. A series of oil shear brakes and clutches allow the drive system to operate in neutral, high speed forward, high speed reverse, low speed forward and low speed reverse. These operating modes are selectable without having to stop and reverse the input shaft which is allowed to rotate constantly in the same direction during all of the above operational modes.

14 Claims, 3 Drawing Sheets

TWO SPEED DRIVE INCORPORATING REVERSE

This is a continuation of U.S. patent application Ser. No. 08/343,129, filed Nov. 22, 1994, now abandoned.

FIELD OF THE INVENTION

The present invention relates to two speed drives incorporating oil shear brakes and clutches. More particularly, the present invention relates to a unique multi-speed drive which utilizes a series of oil shear clutches and brakes in conjunction with a pair of planetary gear sets to provide high, low and reverse speed ranges.

BACKGROUND OF THE INVENTION

Drive systems incorporating clutches, brakes and planetary gear sets are known well in the art and have been used successfully for may years. The prior art designs of drives have experienced problems with the braking and clutching systems as well as problems with the overall lubrication of the components of the drive. In addition to the above problems, the prior art designs of drives did not provide for an efficient method of operating the drive system in the reverse direction. In these prior art drives, reverse drive was obtained by bringing the flywheel to a stop and reversing its direction. This requirement of stopping and starting the flywheel required an excessive amount of time and significantly increased the amount of horsepower with which the flywheel needed to be driven to achieve acceptable performance.

The operating problems of these prior art designs of drives occurred due to the utilization of a plurality of dry friction plates to hold an/or release the various members of the drive system. Due to the wear between these dry friction plates, the drives required constant adjustment and replacement of the clutch and brake assemblies. Also during the operation of these dry clutch and brake assemblies, a significant amount of heat was generated. This generation of heat combined with the excessive wear of the friction plates caused fading of these prior art brake and/or clutch assemblies. In addition to the problems of excessive heat generation and excessive wear of the prior art clutch and brake assemblies was the problem associated with supplying an adequate amount of lubrication to the various components of the drive system.

Oil shear brakes and clutches have been developed to overcome the problems associated with these prior art designs of dry friction plate brakes and clutches. In an oil shear clutch or brake system, over 90% of the start/stop inertia is absorbed by a thin, but positive oil film between the friction plates. This thin oil film thus results in little or no wear between the plates and also no fading of the clutch and/or brake assemblies. The thin oil film between the friction plates also operates to remove the heat generated during the stop/start cycles of the press. With the elimination of the generated heat and wear from the friction plates, there is no longer a practical limit on the drive trip rate or speed.

The oil shear brake and clutch assemblies have also eliminated the problems associated with lubrication of the various components of the drive. The drive housing is now filled with lubricating oil for the oil shear brake and clutch assemblies. This lubricating oil is also utilized to lubricate the moving components of the drive system including bearings, gear teeth and planetary gear systems.

Drive systems incorporating oil shear brake and clutch assemblies have enjoyed wide acceptance in the drive system market. The continued development of these drive systems is directed towards providing a more compact and lower cost drive system which can incorporate additional features without compromising the durability and/or performance characteristics of the drive system.

SUMMARY OF THE INVENTION

The present invention provides the art with a drive system which utilizes a plurality of oil shear brake and clutch assemblies in conjunction with a pair of planetary gear trains. The unique configuration of the drive system of the present invention allows the drive system to operate in high speed forward, low speed forward and reverse while allowing the input to the drive system to maintain rotation in a single direction.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DESCRIPTION OF THE PREFERRED EMBODIMENT

Figure 1:
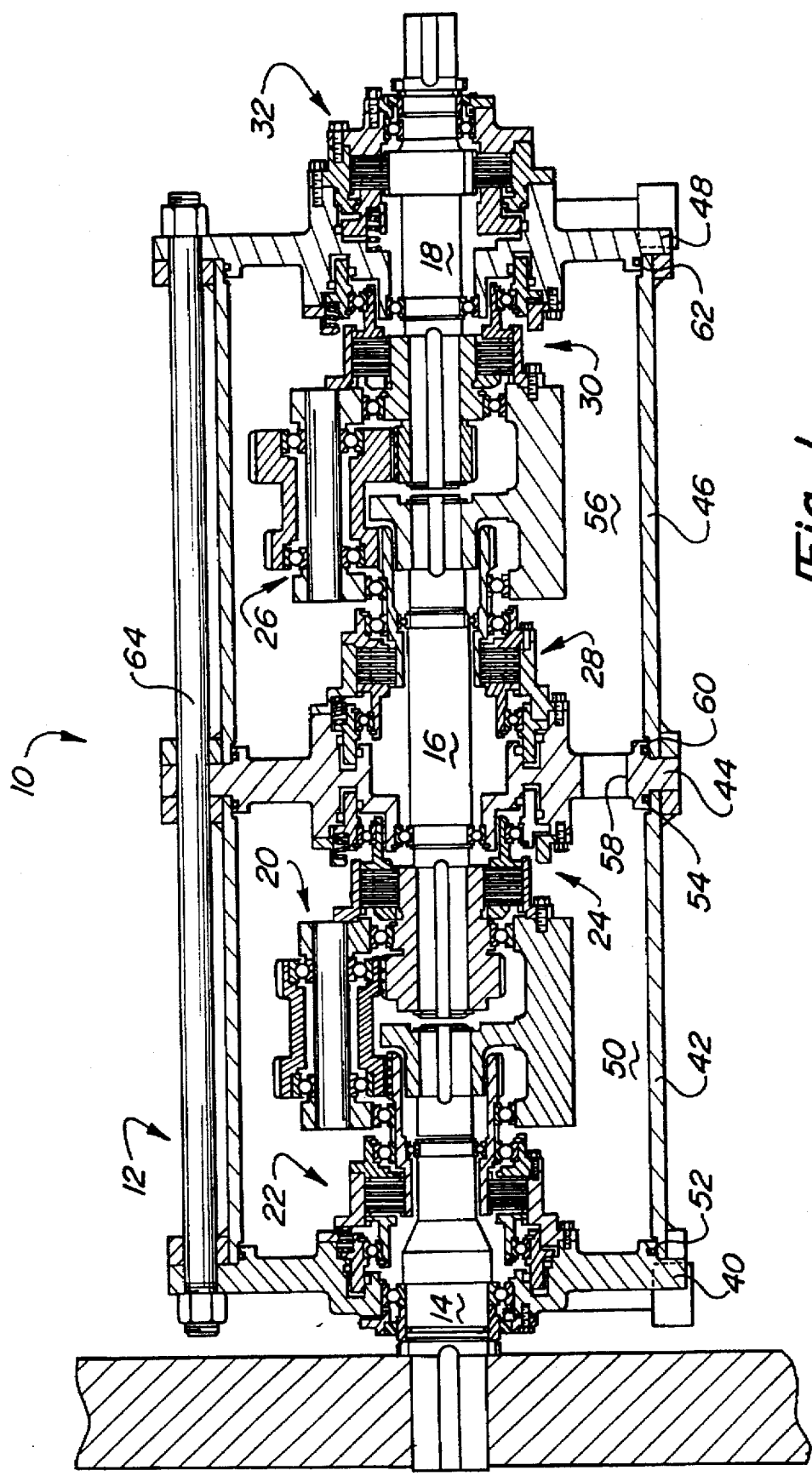
FIG. 1 is a side elevational view, partially in cross section, of a drive system according to the present invention.
Figure 2:
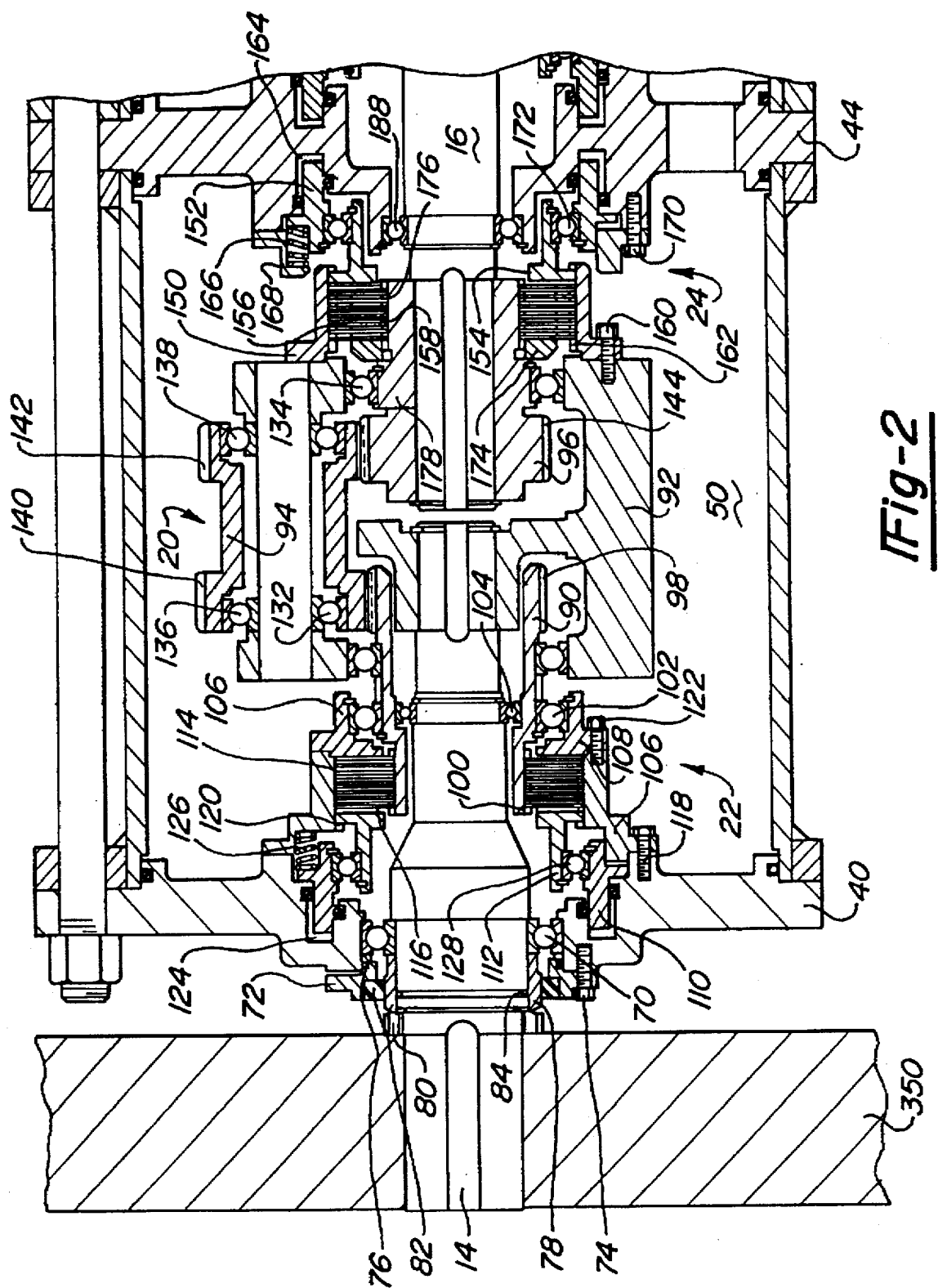
FIG. 2 is an enlarged side elevational view, partially in cross section, of the input side of the drive system shown in FIG. 1.
Figure 3:
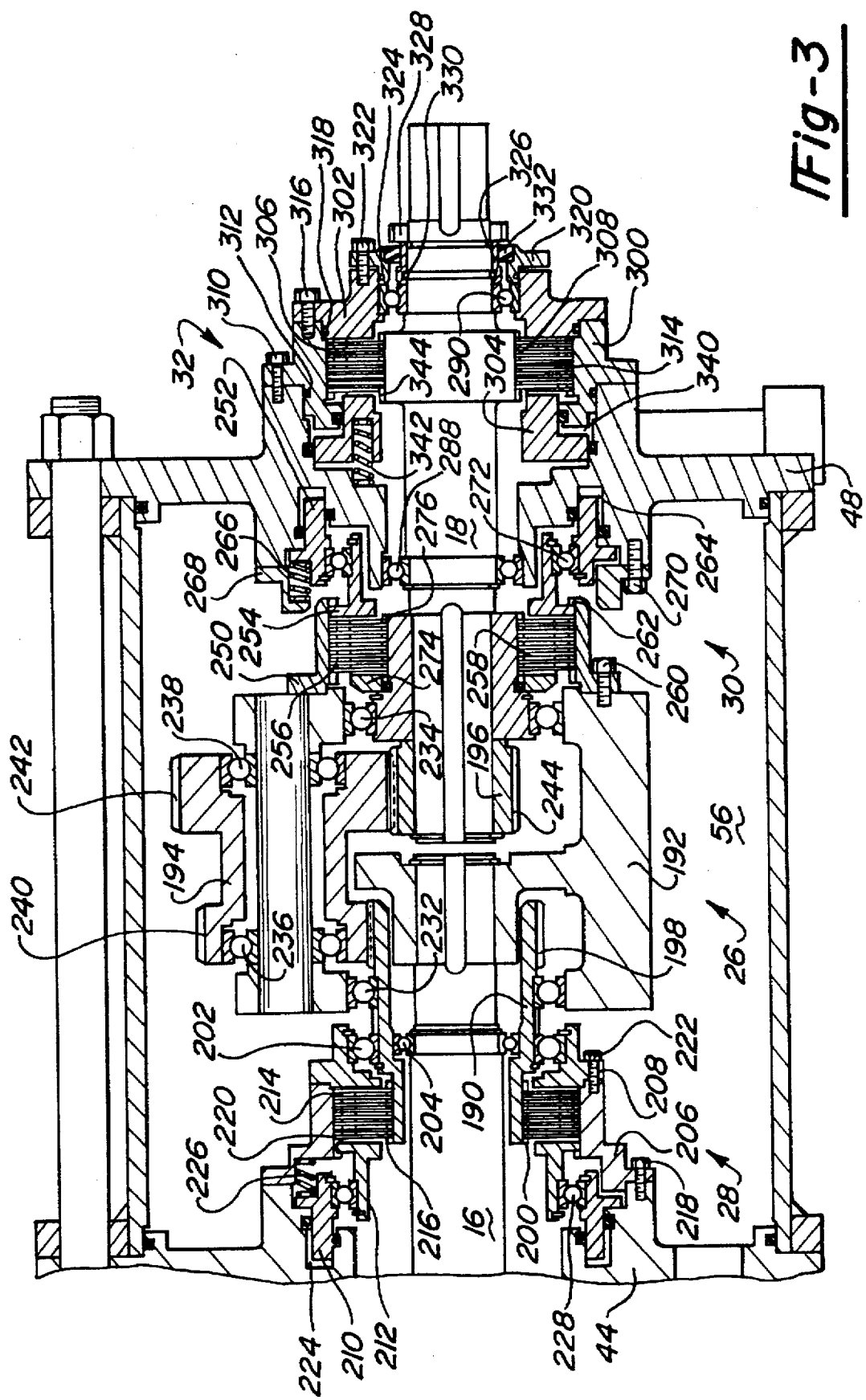
FIG. 3 is an enlarged side elevational view, partially in cross section, of the output side of the drive system shown in FIG. 1.

Referring now to the drawings in which like reference numerals designate like or corresponding parts throughout the several views, there is shown in FIG. 1 through 3 a drive system according to the present invention which is designated generally by the reference numeral 10. Drive system 10 comprises a housing 12, an input shaft 14, an intermediate shaft 16, an output shaft 18, a high/low compound planetary gear train 20, an oil shear brake 22 for locking a member of gear train 20 to housing 12, an oil shear clutch 24 for locking a member of gear train 20 to intermediate shaft 16, a forward/reverse compound planetary gear train 26, an oil shear brake 28 for locking a member of gear train 26 to housing 12, an oil shear clutch 30 for locking member of gear train 26 to output shaft 18 and an oil shear brake 32 for locking output shaft 18 to housing 12.

Housing 12 is a generally cylindrically shaped housing comprising a first end wall 40, a first casing 42, an intermediate wall 44, a second casing 46 and a second end wall 48. First casing 42 extends between first end wall 40 and intermediate wall 44 to define a chamber 50. Chamber 50 contains a specified amount of lubricating oil which is utilized in the operation of drive system 10. Planetary gear train 20, brake 22 and clutch 24 are all located within chamber 50. A pair of seals 52 and 54 are disposed between first casing 42 and end wall 40 and intermediate wall 44, respectively, to maintain an oil seal for chamber 50. Second casing 46 extends between intermediate wall 44 and second end wall 48 to define a chamber 56. Chamber 56 also contains a specified amount of lubricating oils which is utilized in the operation of drive system 10. A plurality of holes 58 extend between chambers 50 and 56 allow for the circulation of oil between the two chambers. Planetary gear train 26, brake 28 and clutch 30 are all located within chamber 56. A pair of seals 60 and 62 are disposed between second casing 46 and intermediate wall 44 and second end wall 48, respectively, to maintain an oil seal for chamber 56. A plurality of threaded rods 64 extend between first end wall 40 and second end wall 48 through intermediate wall 44 in order to maintain the integrity of the assembled housing 12.

Input shaft 14 extends through first end wall 40 and is rollingly supported with respect to end wall 40 by a roller bearing 70. A bearing cap 72 locates bearing 70 with respect to housing 12 and is secured to housing 12 by a plurality of bolts 74 or by other means known well in the art. A seal 76 disposed between bearing cap 72 and housing 12 maintains an oil seal for chamber 50. A spacer 78 and a bearing retainer 80 locate bearing 70 with respect to input shaft 14 and are secured to input shaft 14 by press fitting, threading or other means known well in the art. A seal 82 disposed between input shaft 14 and spacer 78 maintains an oil seal for chamber 50 while an additional seal 84 disposed between spacer 78 and input shaft 14 also maintains an oil seal for chamber 50.

High/low compound planetary gear train 20 comprises a first sun gear 90, a planetary gear carrier 92, a plurality of compound planetary gears 94 and a second sun gear 96. First sun gear 90 is a tubular member having gear teeth 98 located on its outside surface at one end and spline teeth 100 located on its outside surface at the opposite end. Sun gear 90 is rollingly supported with respect to housing 12 by a roller bearing 102 and is also rollingly supported with respect to input shaft 14 by a roller bearing 104. Spline teeth 100 form a portion of oil shear brake 22 which is utilized to lock sun gear 90 to housing 12 when switching between high and low speed operation of drive system 10.

Brake 22 comprises a brake reaction housing 106, a brake stop 108, a piston 110, a brake application member 112, a plurality of stationary friction plates 114 and a plurality of driven friction plates 116. Brake reaction housing 106 is secured to end wall 40 of housing 12 by a plurality of bolts 118. The interior surface of housing 106 includes a plurality of spline teeth 120 for engagement with the plurality of stationary friction plates 114 as will be described later herein. Brake stop 108 is secured to housing 106 by a plurality of bolts 122 and acts as a stop during the application of brake 22.

Piston 110 cooperates with end wall 40 in order to form a pressure chamber 124. A plurality of coil springs 126 are disposed between piston 110 and brake reaction housing 106 in order to bias piston 110 towards end wall 40 or to the left as shown in FIGS. 1 and 2. This biasing of piston 110 operates to release brake 22 as will be described later herein. Brake application member 112 is secured to piston 110 and moves axially along with piston 110 due to the engagement of a roller bearing 128. Disposed between application member 112 and brake stop 108 are the plurality of stationary friction plates 114 and the plurality of driven friction plates 116. The plurality of stationary friction plates 114 are in splined engagement with spline teeth 120 of housing 106 and are interleaved with the plurality of driven friction plates 116 which are in splined engagement with spline teeth 100 of sun gear 90.

Brake 22 is normally in the release condition due to the biasing of springs 126 which urge application member 112 away from brake stop 108. When application of brake 22 is desired, a pressurized fluid is supplied to pressure chamber 124 in order to move piston 110 and application member 112 towards brake stop 108 or to the right as shown in FIGS. 1 and 2. This movement of application member 112 causes compression of friction plates 114 and 116 between application member 112 and brake stop 108 thus locking sun gear 90 to housing 12 due to spline teeth 100 and 120. When the pressurized fluid is released from chamber 124, piston 110 and application member 112 move to the left as shown in FIGS. 1 and 2 releasing brake 22 and allowing sun gear 90 to rotate with respect to housing 12.

Planetary gear carrier 92 is secured to input shaft 14 and thus acts as the input member for high speed, low speed and reverse operation of drive system 10. Carrier 92 is rotatably supported on sun gear 90 by a roller bearing 132 and on intermediate shaft 16 by a roller bearing 134. The plurality of compound planetary gears 94 are each rollingly supported on carrier 92 by a pair of roller bearings 136 and 138. Each compound planetary gear has a first gear 140 which meshes with gear teeth 98 on sun gear 90 and a second gear 142 which meshes with a set of gear teeth 144 on second sun gear 96.

Clutch 24 functions to lock planetary gear carrier 92 to intermediate shaft 16 during the operation of drive system 10. Clutch 24 comprises a clutch reaction housing 150, a piston 152, a clutch engagement member 154, a plurality of driving friction plates 156 and a plurality of driven friction plates 158. Clutch reaction housing 150 is secured to planetary gear carrier 92 by a plurality of bolts 160. The interior surface of housing 150 includes a plurality of spline teeth 162 for engagement with the plurality of driving friction plates 156 as will be described later herein.

Piston 152 cooperates with intermediate wall 44 in order to form a pressure chamber 164. A plurality of coil springs 166 are disposed between piston 152 and a collar 168 which is secured to intermediate wall 44 by a plurality of bolts 170. Springs 166 bias piston 152 towards intermediate wall 44 or to the right as shown in FIGS. 1 and 2. This biasing of piston 152 operates to disengage clutch 24 as will be described later herein. Clutch engagement member 154 is secured to piston 152 and moves axially along with piston 152 due to the engagement of a roller bearing 172. Disposed between engagement member 154 and a stop 174 secured to intermediate shaft 16 are the plurality of driving friction plates 156 and the plurality of driven friction plates 158. The plurality of driving friction plates 156 are in splined engagement with spline teeth 162 of housing 150 and are interleaved with the plurality of driven friction plates 158 which are in splined engagement with a plurality of spline teeth 176 located on a collar 178 which is secured to intermediate shaft 16 for rotation therewith.

Clutch 24 is normally in the released condition due to the biasing of springs 166 which urge engagement member 154 away from stop 174. When engagement of clutch 24 is desired, a pressurized fluid is supplied to pressure chamber 164 in order to move piston 152 and engagement member 154 towards stop 174 or to the left as shown in FIGS. 1 and 2. This movement of engagement member 154 causes compression of friction plates 156 and 158 between engagement member 154 and stop 174 thus locking planetary gear carrier 92 to intermediate shaft 16 due to spline teeth 162 and 176. When the pressurized fluid is released from chamber 164, piston 152 and engagement member 154 move to the right as shown in FIGS. 1 and 2 disengaging clutch 24 and allowing carrier 92 to rotate with respect to intermediate shaft 16.

Intermediate shaft 16 extends through intermediate wall 44 between high/low compound planetary gear train 20 and forward/reverse compound planetary gear train 26 to act as an input member for gear train 26. Intermediate shaft 16 is rollingly supported with respect to intermediate wall 44 by a roller bearing 188.

Forward/reverse compound planetary gear train 26 comprises a first sun gear 190, a planetary gear carrier 192, a plurality of compound planetary gears 194 and a second sun gear 196. First sun gear 190 is a tubular member having gear teeth 198 located on its outside surface at one end and spline teeth 200 located on its outside surface at the opposite end. Sun gear 190 is rollingly supported with respect to housing 12 by a roller bearing 202 and is also rollingly supported with respect to intermediate shaft 16 by a roller bearing 204. Spline teeth 200 form a portion of oil shear brake 28 which is utilized to lock sun gear 190 to housing 12 when switching between forward and reverse operation of drive system 10.

Brake 28 comprises a brake reaction housing 206, a brake stop 208, a piston 210, a brake application member 212, a plurality of stationary friction plates 214 and a plurality of driven friction plates 216. Brake reaction housing 206 is secured to intermediate wall 44 of housing 12 by a plurality of bolts 218. The interior surface of housing 206 includes a plurality of spline teeth 220 for engagement with the plurality of stationary friction plates 214 as will be described later herein. Brake stop 208 is secured to housing 206 by a plurality of bolts 222 and acts as a stop during the application of brake 28.

Piston 210 cooperates with intermediate wall 44 in order to form a pressure chamber 224. A plurality of coil springs 226 are disposed between piston 210 and brake reaction housing 206 in order to bias piston 210 towards intermediate wall 44 or to the left as shown in FIGS. 1 and 2. This biasing of piston 210 operates to release brake 28 as will be described later herein. Brake application member 212 is secured to piston 210 and moves axially along with piston 210 due to the engagement of a roller bearing 228. Disposed between application member 212 and brake stop 208 are the plurality of stationary friction plates 214 and the plurality of driven friction plates 216. The plurality of stationary friction plates 214 are in splined engagement with spline teeth 220 of housing 206 and are interleaved with the plurality of driven friction plates 216 which are in splined engagement with spline teeth 200 of sun gear 190.

Brake 28 is normally in the release condition due to the biasing of springs 226 which urge application member 212 away from brake stop 208. When application of brake 28 is desired, a pressurized fluid is supplied to pressure chamber 224 in order to move piston 210 and application member 212 towards brake stop 208 or to the right as shown in FIGS. 1 and 3. This movement of application member 212 causes compression of friction plates 214 and 216 between application member 212 and brake stop 208 thus locking sun gear 190 to housing 12 due to spline teeth 200 and 220. When the pressurized fluid is released from chamber 224, piston 210 and application member 212 move to the left as shown in FIGS. 1 and 3 releasing brake 28 and allowing sun gear 190 to rotate with respect to housing 12.

Planetary gear carrier 192 is secured to intermediate shaft 16 and thus acts as the input member for forward and reverse operation of gear train 26. Carrier 192 is rotatably supported on sun gear 190 by a roller bearing 232 and on output shaft 18 by a roller bearing 234. The plurality of compound planetary gears 194 are each rollingly supported on carrier 192 by a pair of roller bearings 236 and 238. Each compound planetary gear has a first gear 240 which meshes with gear teeth 198 on sun gear 190 and a second gear 242 which meshes with a set of gear teeth 244 on second sun gear 196.

Clutch 30 functions to lock planetary gear carrier 192 to output shaft 18 during the operation of drive system 10. Clutch 30 comprises a clutch reaction housing 250, a piston 252, a clutch engagement member 254, a plurality of driving friction plates 256 and a plurality of driven friction plates 258. Clutch reaction housing 250 is secured to planetary gear carrier 192 by a plurality of bolts 260. The interior surface of housing 250 includes a plurality of spline teeth 262 for engagement with the plurality of driving friction plates 256 as will be described later herein.

Piston 252 cooperates with second end wall 48 in order to form a pressure chamber 264. A plurality of coil springs 266 are disposed between piston 252 and a collar 268 which is secured to end wall 48 by a plurality of bolts 270. Springs 266 bias piston 252 towards end wall 48 or to the right as shown in FIGS. 1 and 3. This biasing of piston 252 operates to disengage clutch 30 as will be described later herein. Clutch engagement member 254 is secured to piston 252 and moves axially along with piston 252 due to the engagement of a roller bearing 272. Disposed between engagement member 254 and a stop 274 secured to output shaft 18 are the plurality of driving friction plates 256 and the plurality of driven friction plates 258. The plurality of driving friction plates 256 are in splined engagement with spline teeth 262 of housing 250 and are interleaved with the plurality of driven friction plates 258 which are in splined engagement with a plurality of spline teeth 276 located on a collar 278 which is secured to output shaft 18 for rotation therewith.

Clutch 30 is normally in the released condition due to the biasing of springs 266 which urge engagement member 254 away from stop 274. When engagement of clutch 30 is desired, a pressurized fluid is supplied to pressure chamber 264 in order to move piston 252 and engagement member 254 towards stop 274 or to the left as shown in FIGS. 1 and 3. This movement of engagement member 254 causes compression of friction plates 256 and 258 between engagement member 254 and stop 274 thus locking planetary gear carrier 192 to output shaft 18 due to spline teeth 262 and 276. When the pressurized fluid is released from chamber 264, piston 252 and engagement member 254 move to the right as shown in FIGS. 1 and 3 disengaging clutch 30 and allowing carrier 192 to rotate with respect to output shaft 18.

Output shaft 18 extends through wall 48 to act as an output member for drive system 10. Output shaft 18 is rollingly supported with respect to end wall 48 by a roller bearing 288 and with respect to brake 32 by a roller bearing 290.

Brake 32 is utilized as a brake for drive system 10 and operates to lock output shaft 18 to end wall 48 of housing 12. Brake 32 comprises a brake reaction housing 300, a brake stop 302, a piston 304, a plurality of stationary friction plates 306 and a plurality of driven friction plates 308. Brake reaction housing 300 is secured to end wall 48 of housing 12 by a plurality of bolts 310. A seal 312 located between end wall 48 and housing 300 maintains an oil seal for chamber 56. The interior surface of housing 300 includes a plurality of spline teeth 314 for engagement with the plurality of stationary friction plates 306 as will be described later herein. Brake stop 302 is secured to housing 300 by a plurality of bolts 316 and acts as a stop during the application of brake 32. A seal 318 disposed between housing 300 and stop 302 maintains an oil seal for chamber 56.

A bearing cap 320 locates bearing 290 with respect to brake stop 302 and is secured to brake stop 302 by a plurality of bolts 322 or by other means known well in the art. A seal 324 disposed between bearing cap 320 and brake stop 302 maintains an oil seal for chamber 56. A spacer 326 and a bearing retainer 328 locate bearing 290 with respect to output shaft 18 and are secured to output shaft 18 by press fitting, threading or other means known well in the art. A seal 330 disposed between output shaft 18 and spacer 326 maintains an oil seal for chamber 56 while an additional seal 332 disposed between spacer 326 and bearing cap 320 also maintains an oil seal for chamber 56.

Piston 304 cooperates with end wall 48 in order to form a pressure chamber 340. A plurality of coil springs 342 are disposed between piston 304 and end wall 48 in order to bias piston 304 away from end wall 48 or to the right as shown in FIGS. 1 and 3. This biasing of piston 304 operates to apply brake 32 as will be discussed later herein. Disposed between piston 304 and brake stop 302 are the plurality of stationary friction plates 306 and the plurality of driven friction plates 308. The plurality of stationary friction plates 306 are in splined engagement with spline teeth 314 of housing 300 and are interleaved with the plurality of driven friction plates 308 which are in splined engagement with a plurality of spline teeth 344 located on a collar 326 which is fixedly secured to output shaft 18.

Brake 32 is normally in the applied condition due to the biasing of springs 342 which urge piston 304 towards brake stop 302. This biasing of piston 304 causes compression of friction plates 306 and 308 between piston 304 and stop 302 thus locking output shaft 18 to housing 12 due to spline teeth 314 and 344. When it is desired to release brake 32, a pressurized fluid is applied to pressure chamber 340 in order to move piston 304 away from stop 302 or to the left as shown in FIGS. 1 and 3. This movement of piston 304 relieves the compression forces exerted by springs 342 and thus allows output shaft 18 to rotate with respect to housing 12.

The operation of drive system 10 begins with input shaft 14 rotating a constant speed. This rotation can be due to a flywheel 350 or any other means known well in the art. Pressure chambers 124, 164, 224, 264 and 340 are not being supplied with a pressurized fluid. Thus, brake 22 is released due to springs 126, clutch 24 is disengaged due to springs 166, brake 28 is released due to springs 226, clutch 30 is disengaged due to springs 266 and brake 32 is applied due to springs 342. Input shaft 14 is free to rotate with respect to output shaft 18 which is locked to housing 12 by brake 32.

High speed operation of drive system 10 is achieved by providing pressurized fluid to pressure chamber 164 to engage clutch 24, providing pressurized fluid to pressure chamber 264 to engage clutch 30 and providing pressurized fluid to pressure chamber 340 to release brake 32. Brakes 22 and 28 are left in their released condition. When drive system 10 is in the above condition, rotation from input shaft 14 rotates carrier 92 which in turn rotates intermediate shaft 16 through clutch 24. Intermediate shaft 16 rotates carrier 192 which in turn rotates output shaft 18 through clutch 30. The rotation of output shaft 18 by input shaft 14 in this condition is in the same direction and at the same speed as input shaft 14. Output shaft 18 of drive system 10 is stopped by disengaging clutches 24 and 30 and applying brake 32 to lock output shaft 18 to housing 12 while allowing input shaft 14 to continue rotating.

Low speed operation of drive system 10 is achieved by providing pressurized fluid to pressure chamber 124 to apply brake 22 providing pressurized fluid pressure chamber 264 to engage clutch 30 and providing pressurized fluid to pressure chamber 340 to release brake 32. Clutch 24 is left in its disengaged position and brake 28 is left in its released condition. When drive system 10 is in the above condition, rotation from input shaft 14 will rotate carrier 92 which will in turn rotate planetary gears 94. Planetary gears 94 and carrier 92 will rotate around sun gear 90 which is locked to housing 12 by brake 22. Planetary gears 94 will rotate intermediate shaft 16 which will rotate carrier 192 which in turn rotates output shaft 18 through clutch 30. The rotation of output shaft 18 by input shaft 14 in this condition is in the same direction but at a slower speed than that of input shaft 14. The speed ratio of gear train 20 will depend on its configuration and will be determined by the following equation:

$$F = 1 - \left( \frac{C*X}{Y*B} \right)$$

Where:

F=rotation of intermediate shaft 16

C=number of teeth on first sun gear 90

X=number of teeth of second planetary gear 142

Y=number of teeth on first planetary gear 140

B=number of teeth on second sun gear 96

In the preferred embodiment, C=55, X=48, Y=50 and B=57 which provides a 13.57/1 speed reduction. Output shaft 18 of drive system 10 is stopped by releasing brake 22. Disengagement clutch 30 an applying brake 32 to lock output shaft 18 to housing 12 while allowing input shaft 14 to continue rotating.

Reverse operation of drive system 10 can be accomplished in both high speed and low speed operation of drive system 10. For exemplary purposes, reverse operation of drive speed 10 will be described while drive system 10 is operating in high speed. It is to be understood that low speed operation of drive system 10 can be achieved by placing drive system 10 in low speed operation as described above in conjunction with placing drive system 10 in reverse drive as described below.

Reverse high speed operation of drive system 10 is achieved by providing pressurized fluid to pressure chamber 164 to engage clutch 24, providing pressurized fluid to pressure chamber 224 to apply brake 28 and providing pressurized fluid to pressure chamber 340 to release brake 32. Brake 22 is left in its disengaged condition. When drive system 10 is in the above condition, rotation from input shaft 14 will rotate carrier 92 which in turn rotates intermediate shaft 16 through clutch 24. Intermediate shaft 16 rotates carrier 192 which in turn rotates planetary gears 194. Planetary gears 194 and carrier 192 will rotate around sun gear 190 which is locked to housing 12 by brake 28. Planetary gears 194 will then rotate output shaft 18. The rotation of output shaft 18 by input shaft 14 in this condition is in the opposite direction than that of intermediate shaft 16 and input shaft 14. The speed ratio of gear train 26 will depend on its configuration and will be determined by the same equation used for gear train 20:

$$F = 1 - \left( \frac{C*X}{Y*B} \right)$$

Where:

F=rotation of intermediate shaft 18

C=number of teeth on first sun gear 190

X=number of teeth of second planetary gear 242 y=number of teeth on first planetary gear 240

B=number of teeth on second sun gear 196

In the preferred embodiment, C=55, X=68, Y=50 and B=37 which provides a −1.022/1 speed ration. Thus, output shaft 18 will rotate in the opposite direction to intermediate shaft 16 at 102.2% of its speed. Output shaft 18 of drive system 10 is stopped by disengaging clutch 24, releasing brake 28 and applying brake 32 to lock output shaft 18 to housing 12 while allowing input shaft 14 to continue to rotate.

Thus it can be seen that gear train 20 is utilized to produce a high and low speed operation between input shaft 14 and intermediate shaft 16. Gear train 26 accepts its input from intermediate shaft 16, whether it be high speed or low speed and produces a forward or a reverse rotation of output shaft 18. This unique combination of planetary gear trains provides both high and low speed forward operation and well a high and low speed reverse operation.

While the above detailed description describes the preferred embodiment of the present invention, it should be understood that the present invention is susceptible to modification, variation and alteration without deviating from the scope and fair meaning of the subjoined claims.

What is claimed is:

1. A drive system comprising:
   a stationary housing;
   an input member for transmitting rotation to said drive system, said input member rotatably disposed within said housing;
   an output member for transmitting rotation from said drive system, said output member rotatably disposed within said housing;
   a first planetary gear set disposed within said housing between said input member and said output member for providing speed reduction between said input member and said output member; and
   a second planetary gear set disposed within said housing between said input member and said output member for reversing the direction of rotation of said output member with respect to said input member, said second planetary gear set comprising a first sun gear, a second sun gear and a planetary gear carrier rotatably supporting a plurality of compound planetary gears meshingly engaging said first and second sun gears, said planetary gear carrier rotating while reversing the direction of rotation of said support member with respect to said input member.

2. The drive system according to claim 1 wherein said first planetary gear set is selectable between high speed operation and low speed operation.

3. The drive system according to claim 2 further comprising selectively operable brake means for locking a member of said first planetary gear set to said housing in order to select said low speed operation.

4. The drive system according to claim 1 wherein said second planetary gear set is selectable between forward operation and reverse operation.

5. The drive system according to claim 1 further comprising selectively operable brake means for locking a member of said second planetary gear set to said housing in order to select said reverse operation.

6. The drive system according to claim 1 further comprising an intermediate shaft disposed between said first planetary gear set and said second planetary gear set.

7. The drive system according to claim 1 further comprising a brake for locking said output member to said housing.

8. A drive system comprising:
   a stationary housing;
   an input member for transmitting rotation to said drive system, said input member rotatably disposed within said housing;
   an output member for transmitting rotation from said drive system, said output member rotatably disposed within said housing;
   a first planetary gear set disposed within said housing between said input member and said output member, said first planetary gear set being selectable between high speed operation and low speed operation; and
   a second planetary gear set disposed within said housing between said input member and said output member, said second planetary gear set being selectable between forward operation and reverse operation said second planetary gear set comprising a first sun gear, a second sun gear and a planetary gear carrier rotatably supporting a plurality of compound planetary gears meshingly engaging said first and second sun gears, said planetary gear carrier rotating in both said forward and said reverse operation.

9. The drive system according to claim 8 further comprising selectively operable brake means for locking a member of said first planetary gear set to said housing in order to select said low speed operation.

10. The drive system according to claim 9 further comprising selectively operable clutch means for locking a member of said first planetary gear set to a member of said second planetary gear set in order to select said high speed operation.

11. The drive system according to claim 8 further comprising selectively operable brake means for locking a member of said second planetary gear set to said housing in order to select said reverse operation.

12. The drive system according to claim 8 further comprising selectively operable clutch means for locking a member of said second planetary gear set to said output member in order to select said forward operation.

13. The drive system according to claim 8 further comprising an intermediate shaft disposed between said first and second planetary gears sets.

14. The drive system according to claim 8 further comprising a brake for locking said output member to said housing.

* * * * *

UNITED STATES PATENT AND TRADEMARK OFFICE
CERTIFICATE OF CORRECTION

PATENT NO. : 5,716,299

DATED : February 10, 1998

INVENTOR(S) : Gordon M. Sommer

It is certified that error appears in the above-identified patent and that said Letters Patent is hereby corrected as shown below:

Title page, [56] References Cited, delete U.S. Patent "4,470,399 9/1984 Wolff"

Col. 1, line 19, delete "may" and substitute --many-- therefor

Col. 1, line 34, delete "an/or" and substitute --and/or-- therefor

Col. 2, line 60, "wail" should be --wall--

Col. 6, line 11, "wail" should be --wall--

Col. 6, line 16, "3," should be -- 3. --

Col. 8, line 21, delete "of" and substitute --on-- therefor

Col. 8, line 27, delete "Disengagement clutch 30 an" and substitute --Disengagement of clutch 30 and-- therefor Col. 8, line 65, delete "of" and substitute --on-- therefor Col. 8, line 66, "y" should be -- Y --

Col. 9, line 15, delete "and well" and substitute --as well as-- therefor

Signed and Sealed this

Eleventh Day of August 1998

*Attest:*

*Attesting Officer*

BRUCE LEHMAN

*Commissioner of Patents and Trademarks*